US009934275B2

(12) United States Patent
Nguyen et al.

(10) Patent No.: US 9,934,275 B2
(45) Date of Patent: Apr. 3, 2018

(54) QUERY UNION AND SPLIT

(71) Applicant: Red Hat, Inc., Raleigh, NC (US)

(72) Inventors: Filip Nguyen, Brno (CZ); Filip Elias, Vysni Lhoty (CZ)

(73) Assignee: Red Hat, Inc., Raleigh, NC (US)

( * ) Notice: Subject to any disclaimer, the term of this patent is extended or adjusted under 35 U.S.C. 154(b) by 573 days.

(21) Appl. No.: 14/594,977

(22) Filed: Jan. 12, 2015

(65) Prior Publication Data

US 2016/0203182 A1 Jul. 14, 2016

(51) Int. Cl.
*G06F 17/30* (2006.01)
*G06F 7/00* (2006.01)

(52) U.S. Cl.
CPC .................. *G06F 17/3046* (2013.01)

(58) Field of Classification Search
CPC .................................... G06F 17/3046
USPC ........................................ 707/768
See application file for complete search history.

(56) References Cited

U.S. PATENT DOCUMENTS

| 5,822,750 | A | 10/1998 | Jou et al. |
| 6,985,944 | B2 | 1/2006 | Aggarwal |
| 7,685,131 | B2 | 3/2010 | Batra et al. |
| 8,447,772 | B2 | 5/2013 | Carston et al. |
| 8,538,985 | B2 | 9/2013 | Betawadkar-Norwood et al. |
| 8,898,148 | B1 * | 11/2014 | Yagnik .............. G06F 17/30867 707/721 |
| 2010/0161644 | A1 * | 6/2010 | Crim ................. G06F 17/30442 707/768 |
| 2012/0011134 | A1 | 1/2012 | Travnik et al. |
| 2013/0124500 | A1 * | 5/2013 | Beavin .............. G06F 17/30448 707/714 |
| 2014/0122452 | A1 | 5/2014 | Faerber et al. |
| 2015/0074136 | A1 * | 3/2015 | Falter ................ G06F 17/30604 707/760 |
| 2016/0054952 | A1 * | 2/2016 | Mathur ............. G06F 17/30492 707/722 |

OTHER PUBLICATIONS

SQL Optimization Options in Java, 2010, 3 pages, retrieved from http://stackoverflow.com/questions/426110/sql-optimization-options-in-java on Jan. 8, 2015.

(Continued)

*Primary Examiner* — Kuen Lu
(74) *Attorney, Agent, or Firm* — Haynes and Boone, LLP

(57) ABSTRACT

An example method of processing a plurality of queries includes determining, at a database driver, that a first query and a second query are similar. The first query is sent from a first execution thread executing in an application server. The method also includes generating, at the database driver, a union query based on the first and second queries. The method further includes submitting the union query to a database that stores database tables from which data is selected based on the first and second queries. The method also includes receiving a combined result set of the union query from the database and submitting the first query against the combined result set. The method further includes receiving, at the database driver, a first result set of the first query in response to submitting the first query against the combined result set.

20 Claims, 6 Drawing Sheets

(56) References Cited

OTHER PUBLICATIONS

Antonio Lupher, Shark: SQL and Analytics with Cost-Based Query Optimization on Course-Grained Distributed Memory, Jan. 13, 2014, 17 pages, Electrical Engineering and Computer Sciences University of California at Berkeley retrieved from http://www.eecs.berkeley.edu/Pubs/TechRpts/2014/EECS-2014-1.pdf on Jan. 8, 2015.

How to Execute Multiple Select Statements in One Group, Aug. 27, 2013, 5 pages, retrieved from http://www.coderanch.com/t/618735/JDBC/databases/execute-multiple-select-statements-grouphttp://docs.jboss.com/jbossas/clustering/JBossClustering7.pdf on Jan. 8, 2015.

* cited by examiner

350

| Names | City | Age | Salary | |
|---|---|---|---|---|
| John A. | Austin | 32 | 60000 | ← 402 |
| Cheryl D. | San Francisco | 34 | 75000 | ← 404 |
| David F. | Austin | 21 | 25000 | ← 406 |
| Mark N. | San Francisco | 16 | 15000 | ← 408 |
| Pamela R. | San Francisco | 27 | 82500 | ← 410 |

FIG. 4

QUERY UNION AND SPLIT

FIELD OF DISCLOSURE

The present disclosure generally relates to processing queries, and more specifically to reducing the number of queries sent to a database.

BACKGROUND

Enterprise applications may be deployed on an application server that provides data to clients and serves as an interface between clients and database servers. Enterprise applications may store data in and retrieve data from the database. Clients may send data requests by interacting with the application, which may retrieve data from the database based on the data requests.

An application may have multiple threads of execution running in an application server. Each of the execution threads may send a query to a database via a database driver. Query processing at the database is typically a bottleneck in the information system. If execution threads send are almost identical queries to the database via the database driver, the database driver may send the query to the database and fork the results. Some technical difficulties may result in sending the query to the database and forking the results. For example, the almost identical queries may not be sent at the exact same moment, which may result in both queries being sent and processed by the database.

BRIEF SUMMARY

It may be desirable to reduce the number of queries submitted to a database. Methods, systems, and techniques for processing a plurality of queries are provided.

According to some embodiments, a method of processing a plurality of queries includes determining, at a database driver, that a first query and a second query are similar. The first query is sent from a first execution thread executing in an application server. The method also includes generating, at the database driver, a union query based on the first and second queries. The method further includes submitting the union query to a database that stores database tables from which data is selected based on the first and second queries. The method also includes receiving a combined result set of the union query from the database and submitting the first query against the combined result set. The method further includes receiving, at the database driver, a first result set of the first query in response to submitting the first query against the combined result set.

According to some embodiments, a system for processing a plurality of queries includes a database driver that establishes a connection to a database. The database driver generates a union query based on first and second queries, submits the union query to the database, and receives a combined result set of the union query from the database. The system also includes a data federation engine that submits the first query against the combined result set and receives a first result set of the first query.

According to another embodiment, a machine-readable medium includes a plurality of machine-readable instructions that when executed by one or more processors is adapted to cause the one or more processors to perform a method including: determining, at a database driver, that a first query and a second query are similar, the first query being sent from a first execution thread executing in an application server; generating, at the database driver, a union query based on the first and second queries; submitting the union query to a database that stores database tables from which data is selected based on the first and second queries; receiving a combined result set of the union query from the database; submitting the first query against the combined result set; and receiving, at the database driver, a first result set of the first query in response to submitting the first query against the combined result set.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

FIG. 4 is an example of a combined result set, according to some embodiments.

DETAILED DESCRIPTION

Figure 1:
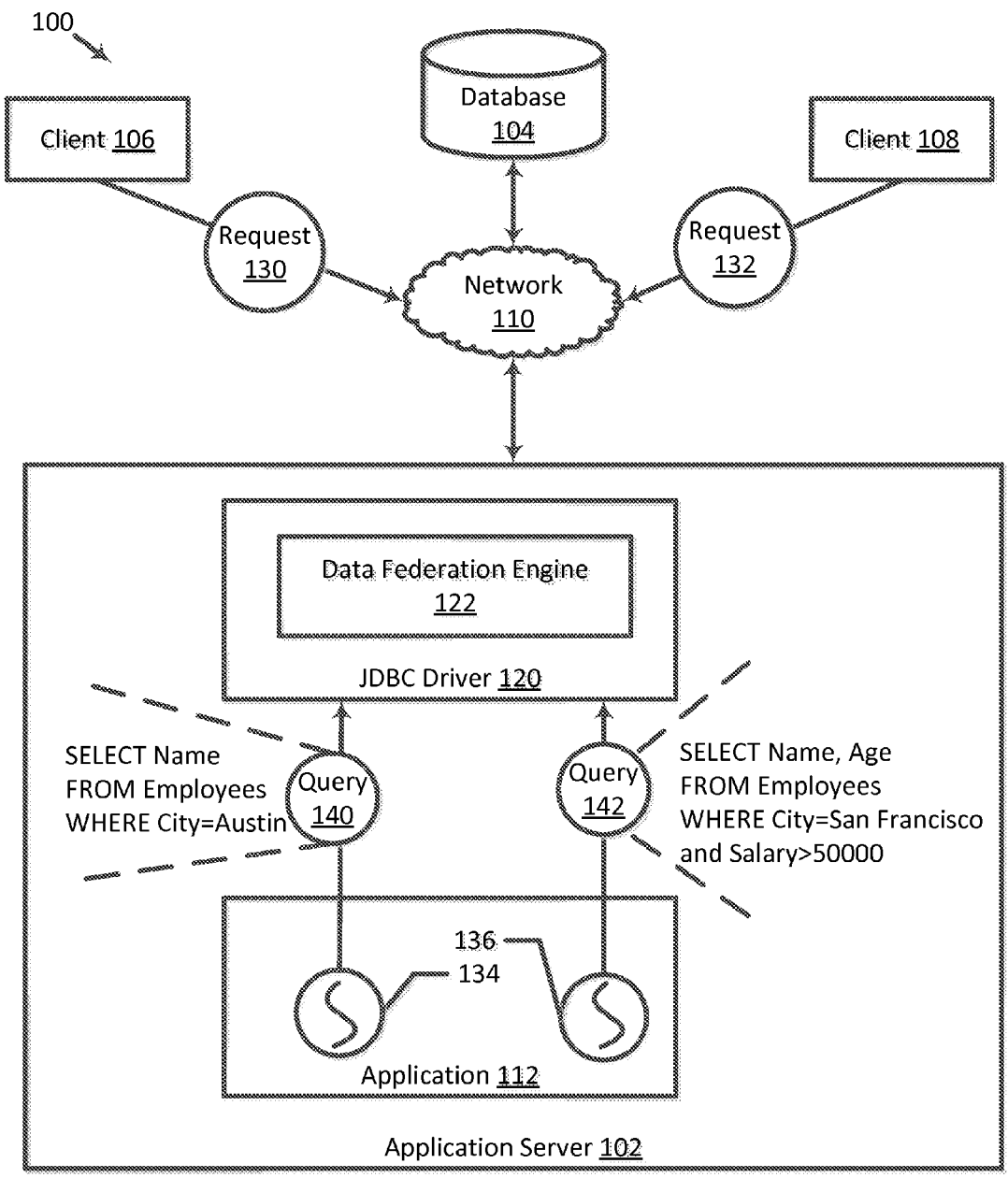
FIG. 1 is a block diagram illustrating a system for processing a plurality of queries, according to some embodiments.

I. Overview
II. Example System Architecture
III. Process a Plurality of Queries
   A. Receive One or More Queries within a Time Interval
   B. Group Similar Queries Together
   C. Generate Union Query Based on Similar Queries
   D. Submit Individual Queries Against the Combined Result Set of Union Query
IV. Example Method
V. Example Computing System

I. OVERVIEW

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

The present disclosure provides techniques to reduce the number of queries sent to and processed by a database. For example, clients may send requests to an application deployed on an application server. Responsive to each received request, the application may spawn an execution thread that submits a query based on the request to a database. The application may spawn multiple execution threads. Additionally, the application may send queries to the database via a database driver that establishes a connection to the database.

If two execution threads send similar queries to the database, the database driver may generate a union query based on the similar queries. Two queries may be similar if they include at least one common table from which to select data. In an example, the queries are Structured Query Language (SQL) queries, and JDBC driver 120 applies the union operator to the similar queries to generate the union query. The database driver may submit the union query to the database in lieu of submitting the similar queries separately to the database. Accordingly, the number of communications between the application server and database may be reduced. A result set of the union query may include data from all of the result sets of the similar queries. To obtain the result set for each of the similar queries, each query may be individually submitted against the result set of the union query. As such, each of the queries may be satisfied and the appropriate result set returned to the client.

According to an embodiment, a method of processing a plurality of queries includes determining, at a database driver, that a first query and a second query are similar. The first query is sent from a first execution thread executing in an application server. The method also includes generating, at the database driver, a union query based on the first and second queries. The method further includes submitting the union query to a database that stores database tables from which data is selected based on the first and second queries. The method also includes receiving a combined result set of the union query from the database and submitting the first query against the combined result set. The method further includes receiving, at the database driver, a first result set of the first query in response to submitting the first query against the combined result set.

The present disclosure provides techniques to process a plurality of queries. Unless specifically stated otherwise, as apparent from the following discussion, it is appreciated that throughout the description, discussions utilizing terms such as "determining," "generating," "sending," and "receiving," "submitting," "placing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

II. EXAMPLE SYSTEM ARCHITECTURE

FIG. 1 is a block diagram illustrating a system 100 for processing a plurality of queries, according to some embodiments. System 100 includes an application server 102, database 104, and clients 106 and 108 coupled over a network 110. Network 110 may be a private network (e.g., local area network (LAN), wide area network (WAN), intranet, etc.), a public network (e.g., the Internet), or a combination thereof. The network may include various configurations and use various protocols including virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, Wi-Fi and HTTP, and various combinations of the foregoing.

An application 112 is deployed on application server 102. Application 112 may be any application that is executable on a computing device having at least one processor and memory. In an example, application server 102 is a web server, and application 112 is a web application. Application 112 may use a relational database management system (RDBMS) for storing and retrieving data. In an example, application 112 communicates with database 104 through standard JAVA® Database Connectivity (JDBC) using a JDBC driver 120. Trademarks are the properties of their respective owners. The JDBC application programming interface (API) is a standard for accessing RDBMSs via JAVA®. The present disclosure provides techniques to reduce the bottleneck between database 104 and application server 102. For example, techniques are provided to reduce the number of queries application 112 sends to database 104 and thus the number of queries processed by database 104.

Client 106 and/or client 108 may interact with application 112 by sending requests to and receiving responses from the application. Although two clients are illustrated, this is not intended to be limiting, and system 100 may include one or more clients that interact with application 112. In an example, client 106 sends a request (e.g., Hypertext Transfer Protocol (HTTP) request) over network 110 to application 112, which may respond to the request by spawning an execution thread that represents a single path of execution. Application 112 may spawn one or more execution threads for each request received from a client, and each of the spawned execution threads may execute the code of one or more specific functions for responding to the request. When application 112 spawns an execution thread, that execution thread becomes an independent entity inside of the application's process space. Each execution thread may have its own execution stack, may communicate with other execution threads and other processes, and may perform input/output (I/O) operations.

Application 112 may have multiple threads of execution executing in application server 102. An execution thread spawned in response to a request may submit a query corresponding to the request to database 104. An execution thread may also be referred to as a client because it is requesting the services of database 104. Database 104 includes one or more database tables that store data. A query may include an expressions clause (e.g., table columns from which or calculations that a client desires to retrieve), one or more database tables from which to retrieve the data requested by the client, and zero or more conditions clauses (e.g., condition(s) that must be met for a database record to be selected). In an example, a query may be a Structured Query Language (SQL) query of the form "SELECT Column1, Column2, . . . , ColumnX FROM Table1, Table2, . . . , TableY WHERE Condition1, Condition2, . . . , ConditionZ."

In FIG. 1, JDBC driver 120 includes an embedded data federation engine 122. Although data federation engine 122 is illustrated in FIG. 1 as being embedded in JDBC driver 120, this is not intended to be limiting and data federation engine 122 may be separate from JDBC driver 120. Client 106 may send a request 130 to application 112. In response to receiving request 130, application 112 may spawn an execution thread 134 that submits a query 140 corresponding to request 130 to database 104. Execution thread 134 may submit query 140 to database 104 via JDBC driver 120. Query 140 may correspond to request 130 because a result set of query 140 is responsive to request 130. In an example, request 130 is a request for employees living in Austin. In this example, query 140 may be "SELECT Name FROM Employees WHERE City=Austin."

Similarly, client 108 may send a request 132 to application 112. In response to receiving request 132, application 112 may spawn an execution thread 136 that submits a query 142 corresponding to request 132 to database 104. Execution thread 136 may submit query 142 to database 104 via JDBC driver 120. Query 142 may correspond to request 132 because a result set of query 142 is responsive to request 132. In an example, request 132 is a request for employees who live in San Francisco and earn more than $50,000 per year and the age of these employees. In this example, query 142 may be "SELECT Name, Age FROM Employees WHERE City=San Francisco and Salary>50000."

III. PROCESS A PLURALITY OF QUERIES

Figure 2:
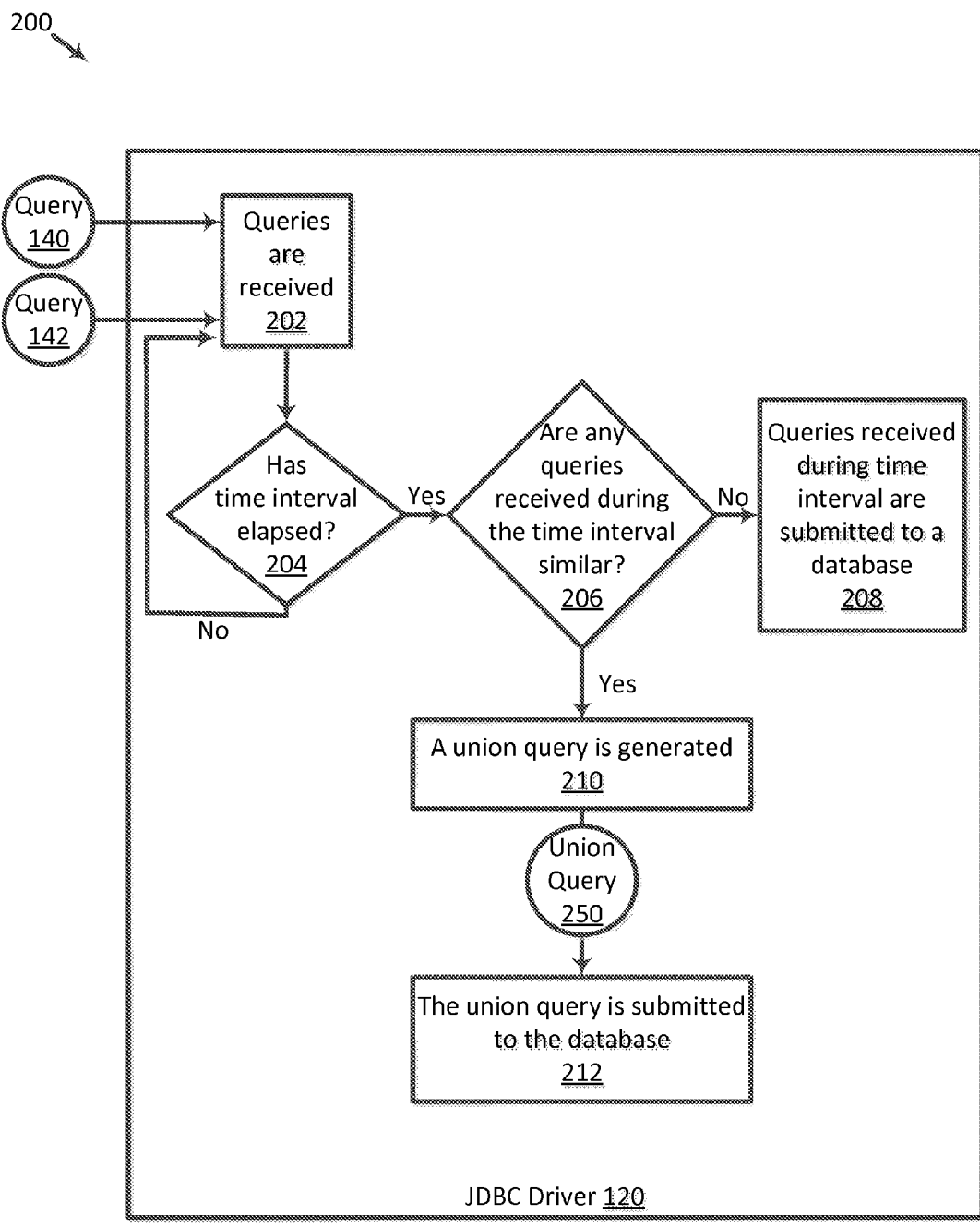
FIG. 2 illustrates a process flow of a JAVA® Database Connectivity (JDBC) driver processing a plurality of queries, according to some embodiments.

FIG. 2 illustrates a process flow 200 of JDBC driver 120 processing a plurality of queries, according to some embodiments.

A. Receive One or More Queries within a Time Interval

At an action 202, queries are received. As discussed, JDBC driver 120 may receive one or more queries from one or more execution threads executing in application server 102. The execution threads may be spawned by the same application deployed on application server 102 or different applications deployed on application server 102. In keeping with the examples illustrated in FIGS. 1 and 2, JDBC driver 120 receives query 140 for submission to database 104, and receives query 142 for submission to database 104. Rather than submit each of the queries to database 104 individually, JDBC driver 120 may wait for a time interval to elapse before sending any of the queries to database 104. As will be discussed further below, JDBC driver 120 may collect queries during the time interval, and then determine whether two or more of these queries can be consolidated into one query that is sent to database 104.

At an action 204, JDBC driver 120 determines whether the time interval has elapsed. JDBC driver 120 continues to wait if the time interval has not yet elapsed. During the time interval, JDBC driver 120 may receive more queries from execution threads executing in application server 102. In FIG. 2, JDBC driver 120 receives a plurality of queries including queries 140 and 142 within the time interval. Although not illustrated in FIG. 2, JDBC driver 120 may receive other queries aside from queries 140 and 142.

B. Group Similar Queries Together

JDBC driver 120 may receive queries and group similar queries together. At an action 206, JDBC driver 120 may determine whether any of the queries received during the time interval are similar. JDBC driver 120 may compare at least two queries of the plurality of queries to determine if they are similar. In some examples, JDBC driver 120 determines that queries 140 and 142 are similar if the queries include at least one common table from which to select data from the database. For example, JDBC driver 120 may determine that example queries 140 and 142 in FIG. 1 are similar because they both select data from the Employees table. In some examples, JDBC driver 120 determines that queries 140 and 142 are similar if the queries include the exact same set of tables from which to select data from the database. For example, JDBC driver 120 may determine that example queries 140 and 142 in FIG. 1 are similar because they both select data from the exact same set of tables. In this example, the set of tables is the Employees table.

At an action 208, JDBC driver 120 may submit the queries (e.g., queries 140 and 142) received during the time interval to database 104 if no similar queries are received during the time interval. Database 104 may receive each of the queries, execute them against the database tables, and retrieve the result sets of the queries. Database 104 may then send the result set of each of the queries to JDBC driver 120, which sends the result set back to the appropriate client.

It is likely that if queries 140 and 142 are determined to be similar, their result sets may overlap. At an action 210, JDBC driver 120 may generate a union query 250 based on queries 140 and 142 if they are determined to be similar. The union query is a union of the similar queries. It should be understood that although two queries are illustrated as being transformed into union query 250, it should be understood that more than two queries may be transformed into a single union query. In other words, union query 250 may be generated based on two or more queries.

C. Generate Union Query Based on Similar Queries

In some embodiments, JDBC driver 120 generates union query 250 by determining a distinct set of tables from which queries 140 and 142 select data from database 104. The distinct set of tables includes one or more table names included in queries 140 and 142. JDBC driver 120 may place each table name of the distinct set of tables in union query 250. In reference to example queries 140 and 142 in FIG. 1, JDBC driver 120 may determine that the distinct set of tables includes the Employees table, and union query 250 may be written to retrieve data from the Employees tables.

JDBC driver 120 may also generate union query 250 by determining a distinct set of columns from which queries 140 and 142 select data from tables stored in database 104. The distinct set of columns includes one or more column names included in queries 140 and 142. JDBC driver 120 may place each column name of the distinct set of columns in union query 250. In reference to example queries 140 and 142 in FIG. 1, JDBC driver 120 may determine that the distinct set of columns includes the Name and Age columns (from the Employees table that is common to both queries), and union query 250 may be written to retrieve data from both the Name and Age columns in the Employees table.

Additionally, JDBC driver 120 may determine a distinct set of conditions included in a conditions clause in queries 140 and 142. The distinct set of conditions includes one or more conditions included in queries 140 and 142. JDBC driver 120 may place each condition of the distinct set of conditions in union query 250. In reference to example queries 140 and 142 in FIG. 1, JDBC driver 120 may determine that the distinct set of conditions includes "City=Austin," "City=San Francisco," and Salary>50000," and union query 250 may be written to select database records that satisfy one or more of these conditions. In some examples, JDBC driver 120 generates union query 250 by applying the union operator on queries 140 and 142. For example, union query 250 may be "SELECT Name, Age FROM Employees WHERE City=Austin or City=San Francisco or Salary>50000." In some examples, JDBC driver 120 may apply the "OR" operator to two or more conditions of the distinct set of conditions if queries 140 and 142 are SQL queries. To ensure that applicable database records are retrieved, JDBC driver 120 may apply the "OR" operator to conditions if they include the same column name (e.g., "City"). For example, union query 250 may be "SELECT*FROM Employees WHERE City=Austin or City=San Francisco or Salary>50000." In this example, the "*" symbol is a wildcard character. In some examples, JDBC driver 120 may apply the "AND" operator to two or more conditions of the distinct set of conditions if queries 140 and 142 are SQL queries. JDBC driver 120 may apply the "AND" operator to reduce the number of database records that are retrieved. For example, union query 250 may be "SELECT*FROM Employees WHERE (City=Austin or City=San Francisco) and Salary>50000.

At an action 212, JDBC driver 120 submits union query 250 to database 104, which stores database tables from which data is selected based on queries 140 and 142. In this example, JDBC driver 120 sends one query (e.g., union query 250) to database 104 rather than the two similar queries (e.g., queries 140 and 142), and thus reduces the number of queries sent to and processed by database 104. In this way, JDBC driver 120 may consolidate similar queries into a union query that JDBC driver 120 sends to database 104 for processing.

It should be understood that more than one union query may be generated based on the queries received during the time interval. For example, four queries (e.g., a first query, second query, third query, and fourth query) may be received during the time interval. Of the four queries, the first and second queries may be determined to be similar, and JDBC driver 120 may generate a first union query based on the first and second queries. Additionally, the third and fourth queries may be determined to be similar, and JDBC driver 120 may generate a second union query based on the third and fourth queries. JDBC driver 120 may submit the first and second union queries to database 104 and retrieve result sets of the first and second union queries.

Additionally, the time interval during which JDBC driver 120 "collects" queries before sending them to database 104 may be configurable. In an example, the time interval is predefined at 100 milliseconds (ms). To prevent the processing of queries from being too time consuming, the length of the time interval may be balanced with the time it takes to process a query in order to achieve time savings from processing a union query rather than processing the similar queries individually.

Figure 3:
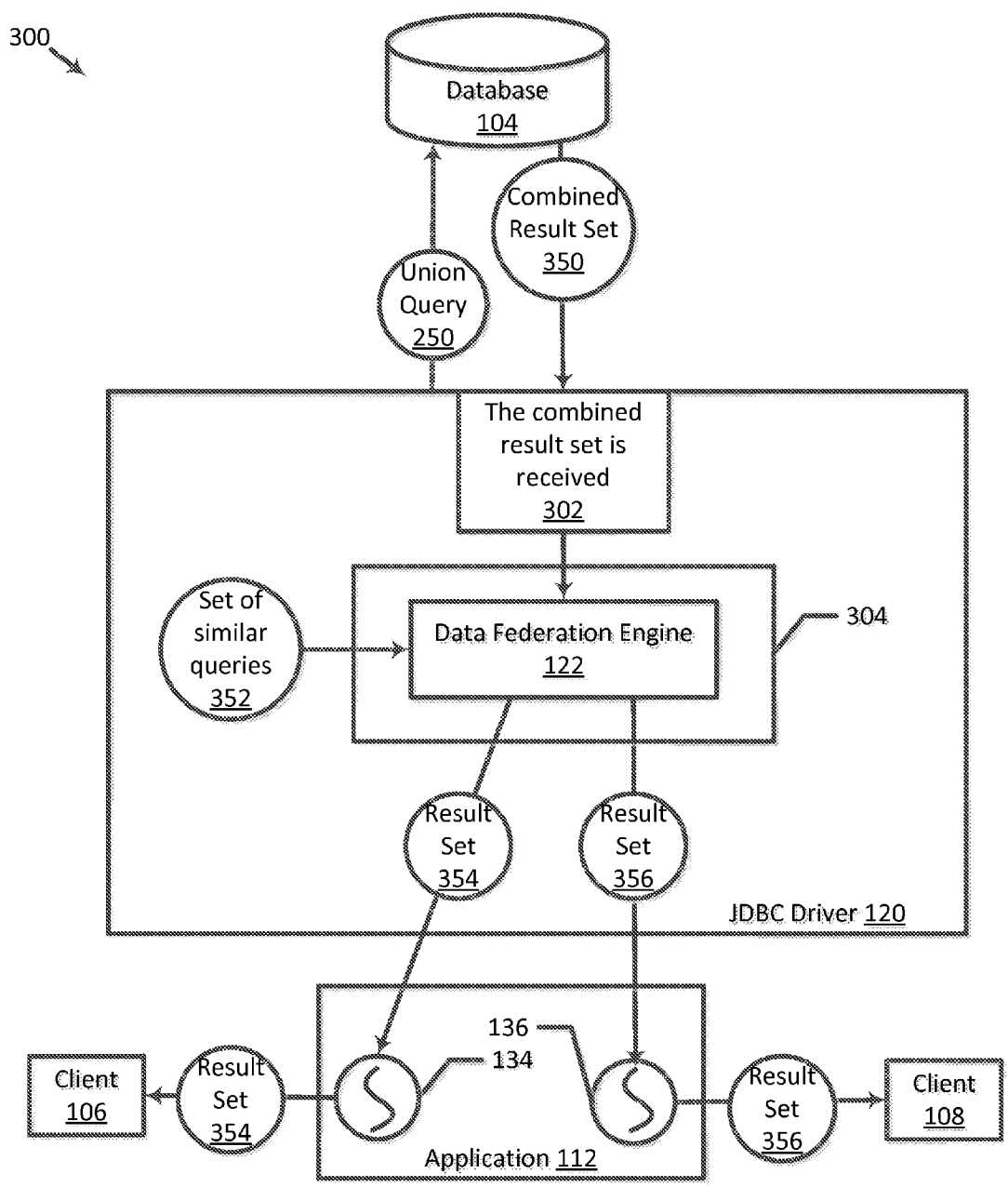
FIG. 3 illustrates a process flow of the JDBC driver processing a union query, according to some embodiments.

FIG. 3 illustrates a process flow 300 of JDBC driver 120 processing a union query, according to some embodiments. In FIG. 3, JDBC driver 120 submits union query 250 to database 104. Database 104 may receive union query 250 and execute it against the database tables stored in the database to obtain a combined result set 350 of union query 250. Database 104 may send combined result set 350 to JDBC driver 120.

At an action 302, JDBC driver 120 may receive combined result set 350. JDBC driver 120 may store combined result set 350 in a memory of application server 102 where data federation engine 122 operates. Combined result set 350 is the result set responsive to submitting union query 250 against database 104's database tables, and is not the result set of the original queries. FIG. 4 is an example of data included in a combined result set, according to some embodiments. In the example illustrated in FIG. 4, combined result set 350 includes five database records including entries 402, 404, 406, 408, and 410. The database records include the names and ages of employees who live in Austin or in San Francisco or who earn more than $50,000 per year. In this example, the names in entries 402 and 406 (e.g., John A. and David F.) are included in the result set of query 140, and the names and ages in entries 404 and 410 (e.g., Cheryl D, 34; Pamela R., 27) are included in the result set of query 142. Some database records included in combined result set 350 may not be included in any of the result sets of the individual queries. For example, entry 408 was not included in a result set of query 140 or of query 142. Additionally, some database records included in combined result set 350 may be included in more than one result set of the individual queries. In another example, combined result set 350 may include the names and ages of employees who live in Austin or in San Francisco and who earn more than $50,000 per year.

Combined result set 350 includes the requested data for all of the grouped similar queries used to generate union query 250. Accordingly, combined result set 350 may include too much data relative to the result set corresponding to each of the individual queries. JDBC driver 120 may use the services of data federation engine 122 to determine the result set for each of the individual queries in order to satisfy them. At an action 304, data federation engine 122 obtains combined result set 350 and a set of similar queries 352, where set of similar queries 352 includes the similar queries used to generate union query 250. In an example, set of similar queries 352 includes queries 140 and 142.

D. Submit Individual Queries Against the Combined Result Set of Union Query

Data federation engine 122 may process combined result set 350 by splitting it to satisfy each of the originally combined queries (e.g., queries 140 and 142). In some embodiments, data federation engine 122 submits each of the original queries 140 and 142 against combined result set 350 in order to extract the result set for the individual queries. Each of result set 354 and result set 356 is a subset of combined result set 350. The data included in result sets 354 and 356 may overlap.

Data federation engine 122 may obtain a result set for each of the queries in set of similar queries 352 in response to submitting the query against combined result set 350. For example, data federation engine 122 may submit query 140 against combined result set 350 to determine result set 354, which is the result set of query 140. Similarly, data federation engine 122 may submit query 142 against combined result set 350 to determine result set 356, which is the result set of query 142.

JDBC driver 120 may then send the result sets back to their appropriate clients. For example, JDBC driver 120 may send result set 354 to execution thread 134, which may send result set 354 to client 106. JDBC driver 120 may also send result set 356 to execution thread 136, which may send result set 356 to client 108.

As discussed above and further emphasized here, FIGS. 1-3 are merely examples, which should not unduly limit the scope of the claims. For example, it should be understood that one or more modules or components in FIG. 1 (e.g., JDBC driver 120 and data federation engine 122) may be combined with another module or component. It should also be understood that one or more modules or components in FIG. 1 may be separated into more than one module or component.

Additionally, although one application is illustrated as being deployed on application server 102, it should be understood that more than one application may be deployed on application server 102. Additionally, each of the applications deployed on application server 102 may use the same database driver (e.g., JDBC driver 120) and may spawn an execution thread that submits a query to JDBC driver 120. JDBC driver 120 may generate a union query based on any of these received queries, which may be received from execution threads allocated to different process spaces or the same process space in memory. In an example, execution thread 134 is spawned by application 112 and execution thread 136 is spawned by an application different from application 112. In this example, JDBC driver 120 may generate a union query based on queries received from execution threads 134 and 136.

IV. EXAMPLE METHOD

Figure 5:
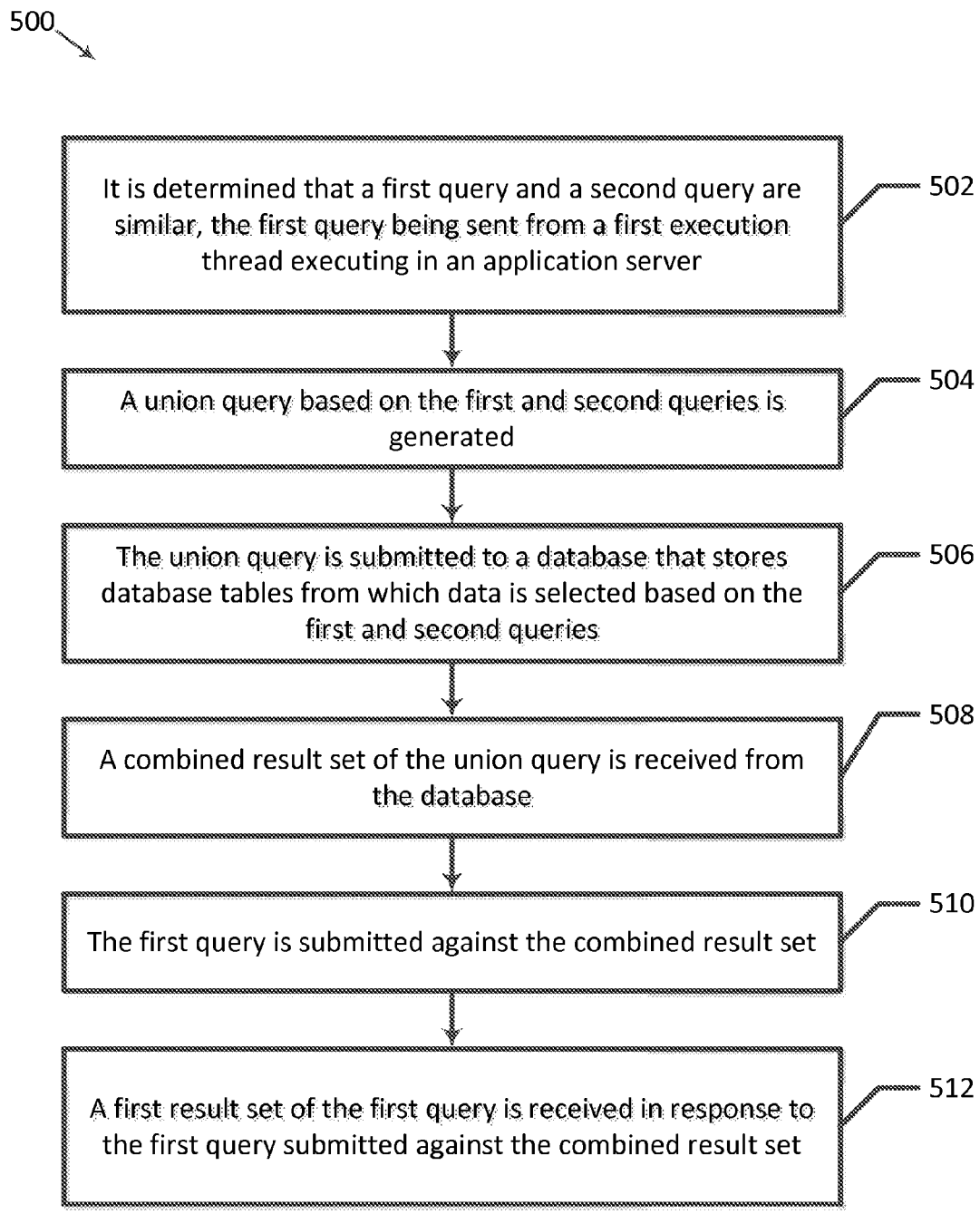
FIG. 5 is a flowchart illustrating a method of processing a plurality of queries, according to some embodiments.

FIG. 5 is a flowchart illustrating a method 500 of processing a plurality of queries, according to some embodiments. Method 500 is not meant to be limiting and may be used in other applications.

In FIG. 5, method 500 includes blocks 502-512. In a block 502, it is determined that a first query and a second query are similar, the first query being sent from a first execution thread executing in an application server. In an example, JDBC driver 120 determines that query 140 and query 142 are similar, query 140 being sent from execution thread 134 executing in application server 102. In a block 504, a union query based on the first and second queries is generated. In an example, JDBC driver 120 generates union query 250 based on queries 140 and 142. In a block 506, the union query is submitted to a database that stores database tables from which data is selected based on the first and second queries. In an example, JDBC driver 120 submits union query 250 to database 104, which stores database tables from which data is selected based on queries 140 and 142.

In a block 508, a combined result set of the union query is received from the database. In an example, JDBC driver 120 receives combined result set 350 of union query 250 from database 104. In a block 510, the first query is submitted against the combined result set. In an example, data federation engine 122 submits query 140 against combined result set 350. In a block 512, a first result set of the first query is received in response to the first query submitted against the combined result set. In an example, JDBC driver 120 receives result set 354 of query 140 in response to submitting query 140 against combined result set 350.

In some embodiments, one or more actions illustrated in blocks 502-512 may be performed for any number of queries received by JDBC driver 120 within a time interval. Additionally, it is also understood that additional processes may be inserted before, during, or after blocks 502-512 discussed above. It is also understood that one or more of the blocks of method 500 described herein may be omitted, combined, or performed in a different sequence as desired.

V. EXAMPLE COMPUTING SYSTEM

Figure 6:
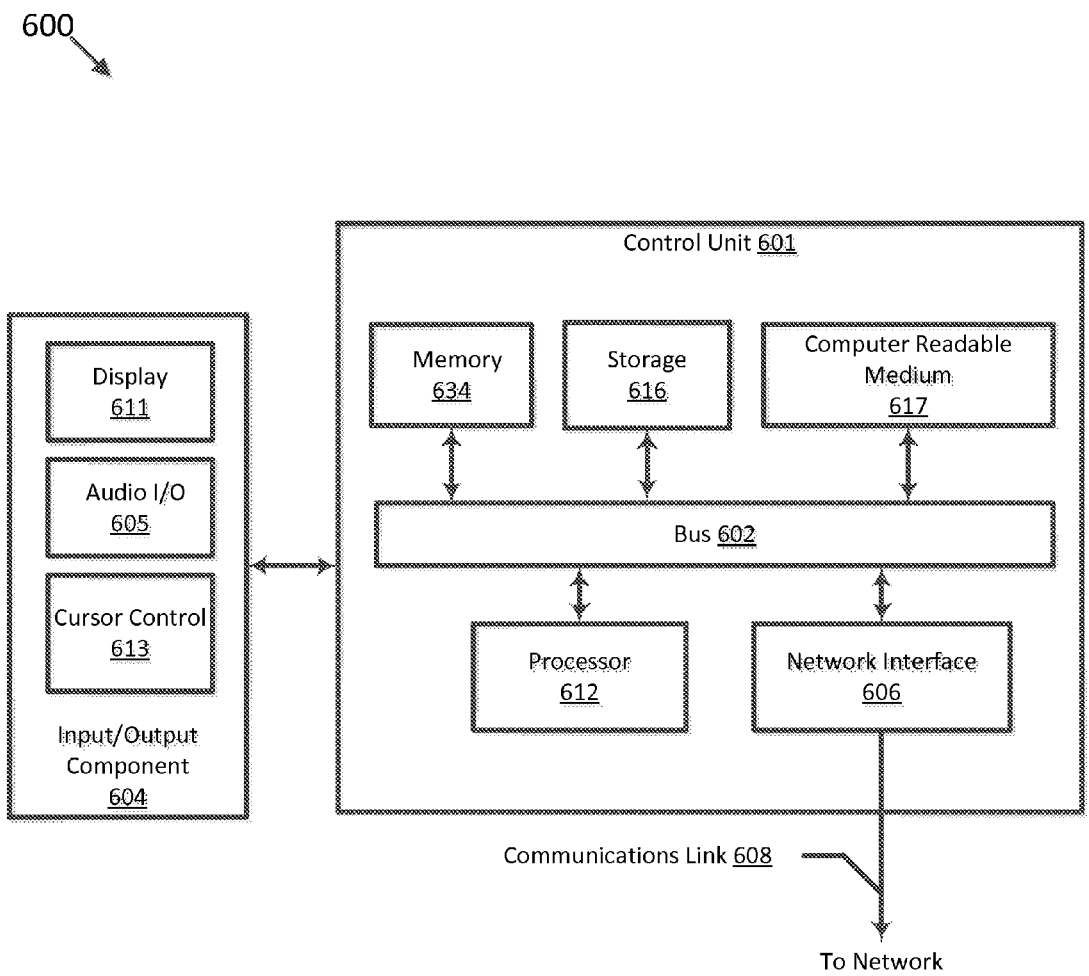
FIG. 6 is a block diagram of an electronic system suitable for implementing one or more embodiments of the present disclosure.

FIG. 6 is a block diagram of a computer system 600 suitable for implementing one or more embodiments of the present disclosure. Each of JDBC driver 120, data federation engine 122, and application 112 may execute on a computing device. The computing device may include one or more storage devices each selected from a group including a floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the application server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 600 includes a bus 602 or other communication mechanism for communicating information data, signals, and information between various components of computer system 600. In an example, application 112 and JDBC driver 120 may communicate using bus 602. A processor 612, which may be a micro-controller, digital signal processor (DSP), or other processing component, processes these various signals, such as for display on computer system 600 or transmission to other devices via communications link 608. Components of computer system 600 also include a system memory component 634 (e.g., RAM), a static storage component 616 (e.g., ROM), and/or a disk drive 617. Computer system 600 performs specific operations by processor 612 and other components by executing one or more sequences of instructions contained in system memory component 634. For example, portions of application 112, JDBC driver 120, and data federation engine 122 may reside in memory 634 and may execute on processor 612. An application deployed on application server 102 may have its own private view of a region of memory 634. Execution threads spawned by the application may be allocated a region of memory 634 inside the application's process space. Each thread may have a reserved region of memory referred to as a stack.

Components include an input/output (I/O) component 604 that processes a user action, such as selecting keys from a keypad/keyboard, selecting one or more buttons or links, etc., and sends a corresponding signal to bus 602. I/O component 404 may include an output component such as a display 611, and an input control such as a cursor control 613 (such as a keyboard, keypad, mouse, etc.). An optional audio I/O component 605 may also be included to allow a user to use voice for inputting information by converting audio signals into information signals. Audio I/O component 605 may allow the user to hear audio. A transceiver or network interface 606 transmits and receives signals between computer system 600 and other devices via a communications link 608 to a network. In an embodiment, the transmission is wireless, although other transmission mediums and methods may also be suitable.

Logic may be encoded in a computer readable medium 617, which may refer to any medium that participates in providing instructions to processor 612 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 634, and transmission media includes coaxial cables, copper wire, and fiber optics, including wires that include bus 602. In an embodiment, the logic is encoded in non-transitory computer readable medium. Transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read. In various embodiments of the present disclosure, execution of instruction sequences (e.g., method 400) to practice the present disclosure may be performed by computer system 600. In various other embodiments of the present disclosure, a plurality of computer systems 600 coupled by communications link 608 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable media. It is also contemplated that the application software identified herein may be implemented using one or more general purpose or specific purpose computers and/or computer systems, networked and/or otherwise. Where applicable, the ordering of various blocks described herein may be changed, combined into composite blocks, and/or separated into sub-blocks to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure.

What is claimed is:

1. A method of processing a plurality of queries, comprising:
    determining, at a database driver, whether a first query and a second query are similar, the first query being sent from a first execution thread executing in an application server, wherein the first and second queries are similar if the first and second queries include a set of common database tables from which to select data; and
    in response to a determination that the first and second queries are similar:
        determining a distinct set of conditions included in a conditions clause in the first and second queries;
        generating, at the database driver, a union query based on the first and second queries, wherein the union query includes the set of common database tables and each condition of the distinct set of conditions;
        submitting the union query to a database that stores the set of common database tables from which data is selected based on the first and second queries;
        receiving a combined result set of the union query from the database;
        submitting the first query against the combined result set; and
        receiving, at the database driver, a first result set of the first query in response to submitting the first query against the combined result set.

2. The method of claim 1, further including:
    sending the first result set to the first execution thread.

3. The method of claim 2, wherein the second query is sent from a second execution thread executing in the application server, the method further including:
    submitting the second query against the combined result set; and
    receiving a second result set of the second query in response to submitting the second query against the combined result set.

4. The method of claim 1, further including:
    receiving the first and second queries within a time interval.

5. The method of claim 1, wherein the generating a union query includes:
    determining a distinct set of tables from which the first and second queries select data from the database, the distinct set of tables including one or more table names of the set of common database tables; and
    placing each table name of the distinct set of tables in the union query.

6. The method of claim 5, wherein the generating a union query includes:
    determining a distinct set of columns from which the first and second queries select data from tables stored in the database, the distinct set of columns including one or more column names; and
    placing each column name of the distinct set of columns in the union query.

7. The method of claim 5, wherein the generating a union query includes:
    placing each condition of the distinct set of conditions in the union query.

8. The method of claim 1, wherein the determining includes determining that the first and second queries include the same set of tables from which to select data.

9. The method of claim 1, wherein the first and second queries are Structured Query Language (SQL) queries, and wherein the generating a union query includes applying a union operator on the first and second queries.

10. The method of claim 1, further including:
    receiving the first query;
    receiving the second query from a second execution thread executing in the application server;
    if the first and second queries are not received within a time interval, submitting the first and second queries to the database; and
    in response to a determination that the first and second queries are not similar, submitting the first and second queries to the database,
    wherein determining whether the first query and the second query are similar includes determining, at the database driver, whether the first and second queries are similar if the first and second queries are received within the time interval.

11. The method of claim 1, wherein the first result set of the first query does not overlap with a second result set of the second query.

12. The method of claim 1, wherein the combined result set includes one or more records absent from the first result set of the first query and a second result set of the second query.

13. The method of claim 1, wherein the first result set is mutually exclusive of a second result set of the second query.

14. A system for processing a plurality of queries, comprising:
    a non-transitory memory; and
    one or more hardware processors coupled to the non-transitory memory and configured to read instructions from the non-transitory memory to cause the system to perform operations comprising:

determining, at a database driver, whether a first query and a second query are similar, the first query being sent from a first execution thread executing in an application server, wherein the first and second queries are similar if the first and second queries include a set of common database tables from which to select data; and in response to a determination that the first and second queries are similar:
  determining a distinct set of conditions included in a conditions clause in the first and second queries;
  generating, at the database driver, a union query based on the first and second queries, wherein the union query includes the set of common database tables and each condition of the distinct set of conditions;
  submitting the union query to a database that stores the set of common database tables from which data is selected based on the first and second queries;
  receiving a combined result set of the union query from the database;
  submitting the first query against the combined result set and
  receiving, at the database driver, a first result set of the first query in response to submitting the first query against the combined result set.

15. The system of claim 14, wherein the second query is sent from a second execution thread executing in the application server, the operations further including:
  submitting the second query against the combined result set and
  receiving a second result set of the second query in response to submitting the second query against the combined result set.

16. The system of claim 14, wherein an application is deployed on the application server and spawns the first execution thread and a second execution thread, and wherein the first execution thread sends the first query to the database driver, and the second execution thread sends the second query to the database driver.

17. The system of claim 16, wherein the application server is a web server and the application is a web application.

18. The system of claim 14, wherein the database driver is a Java Database Connectivity (JDBC) driver.

19. A non-transitory machine-readable medium comprising a plurality of machine-readable instructions that when executed by one or more processors is adapted to cause the one or more processors to perform a method comprising:
  determining, at a database driver, whether a first query and a second query are similar, the first query being sent from a first execution thread executing in an application server, wherein the first and second queries are similar if the first and second queries include a set of common database tables from which to select data; and
  in response to a determination that the first and second queries are similar:
    determining a distinct set of conditions included in a conditions clause in the first and second queries;
    generating, at the database driver, a union query based on the first and second queries, wherein the union query includes the set of common database tables and each condition of the distinct set of conditions;
    submitting the union query to a database that stores the set of common database tables from which data is selected based on the first and second queries;
    receiving a combined result set of the union query from the database;
    submitting the first query against the combined result set; and
    receiving, at the database driver, a first result set of the first query in response to submitting the first query against the combined result set.

20. The machine-readable medium of claim 19, wherein the method further includes:
  submitting the second query against the combined result set; and
  receiving a second result set of the second query in response to submitting the second query against the combined result set.

* * * * *